United States Patent [19]

Fallenius

[11] 4,078,026

[45] Mar. 7, 1978

[54] DEVICE FOR DISPERSING GAS INTO A LIQUID

[75] Inventor: Kai Fallenius, Tapiola, Finland

[73] Assignee: Outokumpu Oy, Helsinki, Finland

[21] Appl. No.: 698,900

[22] Filed: Jun. 23, 1976

Related U.S. Application Data

[63] Continuation of Ser. No. 474,234, May 29, 1974, abandoned.

[30] Foreign Application Priority Data

Jun. 5, 1973 Finland .............................. 1823/73

[51] Int. Cl.² .............................................. B01F 3/04
[52] U.S. Cl. ..................... 261/87; 209/169; 210/221 M; 261/93; 361/102
[58] Field of Search ............ 261/87, 93, 91, 29, 261/36 R, 123; 209/169; 259/23; 210/219, 220, 221 R

[56] References Cited

U.S. PATENT DOCUMENTS

| | | | |
|---|---|---|---|
| 2,609,097 | 9/1952 | Dering | 209/169 |
| 2,892,543 | 6/1959 | Daman | 261/87 X |
| 2,928,665 | 3/1960 | Epprecht | 261/87 |
| 3,327,851 | 6/1967 | Anderson | 209/169 |
| 3,409,130 | 11/1968 | Nakamura | 261/93 X |
| 3,491,880 | 1/1970 | Reck | 209/169 X |
| 3,512,762 | 5/1970 | Umbricht | 261/87 |
| 3,559,957 | 2/1971 | Hurter | 261/93 X |
| 3,584,840 | 6/1971 | Fuchs | 261/87 X |

FOREIGN PATENT DOCUMENTS

1,230,399  12/1966  Germany .............................. 261/87

Primary Examiner—Tim R. Miles
Assistant Examiner—Richard L. Chiesa
Attorney, Agent, or Firm—Brooks, Haidt, Haffner & Delahunty

[57] ABSTRACT

In a device for dispersing gas, e.g., air into a liquid or slurry in motion, wherein the surface at which dispersing takes place has a vertical extension and thus is subjected to varying hydrostatic pressure effected by the liquid or slurry, dispersing is optimized and the performance essentially improved by compensating the varying hydrostatic pressure with a dynamic pressure caused by the liquid in motion and varying in a desired manner so that the total pressure at least at most of the dispersing surface is substantially equalized. Said compensating is effected by providing for the correct flow rate and corresponding shape of the dispersing surfaces and other possible members influencing the liquid flow. In one embodiment the dispersing surface is represented by the envelope surface of a rotor rotating about a vertical axis.

5 Claims, 15 Drawing Figures

DEVICE FOR DISPERSING GAS INTO A LIQUID

This is a continuation of formerly copending application Ser. No. 474,234, filed May 29, 1974, and now abandoned.

BACKGROUND OF THE INVENTION

1. Field of the Invention

The present invention relates to a device for dispersing gas, e.g., air, into a liquid or a slurry which is in motion. As a specific example of one field of application of the invention flotation cells may be mentioned.

In addition to carrying out flotation, the invention can be applied to any process in which air is caused to mix as fine bubbles into a liquid or slurry.

2. Description of the Prior Art

Froth flotation is used in mineral processing to separate valuable minerals from gangue. Generally speaking, when the flotation process is used, different types of particles are separated from each other at the interface of two flowing phases which are in contact; at least one of the phases must be a liquid. The interface can be formed by two liquids or a liquid and a gas. The separation can take place, for example, by causing part of the particles to adhere to the said interface by means of suitable chemicals while the others do not.

Devices called flotation machines, flotation cells, or flotators are used in the practical application of the flotation process. The task of the flotation machine is:

1. To produce the said interface between, for example, a liquid phase and a gas phase.
2. To bring the particles to be separated and the said interface into contact with each other.
3. To transfer the particles to be recovered and those to be rejected in their own directions.

It is advantageous for the efficiency of the separation in the flotation process that the interface between the phases is as large as possible and that the impact of the particles against the interface is as large as possible. In a modification, the same applies if the question is of the dissolving of a solid or a liquid into another liquid.

Especially regarding the froth flotation phenomenon it must be noted that the amount of energy consumed by the flotation machine alone does not guarantee a good technological and economic result, but the decisive factor is, following the above principles, that the dispersion of the gas is efficient, that the mineral particles remain in motion, and that the formation of gas-bubble mineral-particle aggregates is effective.

The number of flotation machine models has been immense in the 60 years during which the froth flotation technique has been used to a noteworthy extent. Most of the models have been created only to disappear. The principal types currently on the market are as follows:

1. Pneumatic flotation machines in which the ore slurry is kept as a suspension by blowing low-pressure air to the bottom of the machine through pipes, nozzles, etc. The proportion of machines of this type is, however, relatively small at present.
2. Mechanical flotation machines in which a rotor which constitutes a part of the driving mechanism of the machine sucks the air from outside the machine and disperses it into the slurry and keeps the slurry as a suspension.
3. Mechanical-pneumatic flotation machines in which the role of the rotor is to keep the slurry as a suspension but in which the requisite air is fed by overpressure from outside the machine. The air is usually dispersed by the rotor.

In the mechanical and mechanical-pneumatic flotation machines the driving mechanism consists of a rotor-stator combination. At present the most common types of mechanisms on the market are:

1. The so-called Denver mechanism the prototype of which was patented for the first time by A. W. Fahrenwald in 1934 (U.S. Pat. No. 1,984,366). It has a rotating horizontal disk-like impeller with low ribs on both the upper and the lower surface. Around the impeller there is a stabilizer provided with fixed radial ribs on the lower side. The impeller takes air through a stand pipe around the shaft of the machine. The sides of the ribs which face each other in the impeller and the stabilizer are vertical.

2. The so-called Fagergren mechanism (U.S. Pat. No. 1,963,122 dated 1934). In its older form both the rotor and the stator are similar "cages" assembled from two end rings and vertical tubes between them.

The rotating rotor inside the stationary stator sucks the slurry with its lower end impeller and air through the stand pipe surrounding the shaft with its upper end impeller.

In the newer Fagergren type the previously some 300-400 mm long tubes have been converted into vertical blades which start directly from the rotor center and widen towards the periphery, while the stator is a cylinder which surrounds the rotor and has a perforated mantle.

3. In the Agitair flotation machine (U.S. Pat. No. 3,327,851) the rotor consists of a rotating plate with a smooth upper surface which has downwards-directed, vertical "fingers" at regular intervals along its edges. The stator consists of radial, rectangular plates; the rotor rotates in its open center.

4. The horizontal, disk-like rotor of the driving mechanism of the VK-3 flotation machine (Finnish Pat. No. 45,416) has blades on both sides. Above the rotor there is a closed stop plate; when the rotor rotates, a strong suction is produced in the space between the plate and the rotor surface to admit slurry into the machine. The low pressure air fed through the hollow shaft is dispersed into the slurry by the lower blades of the rotor when it flings the slurry through the spaces between the plates of the stator surrounding the rotor and assembled from radial, rectangular, vertical plates.

The flotation machines on the market in addition to those described above are more or less variations of the same. They all seem to have in common the characteristic that the machine construction is based on practical experience and momentary revelation rather than understanding the underlying physical phenomena.

SUMMARY OF THE INVENTION

The present invention provides a device for dispersing gas, e.g., air, into a liquid or a slurry in motion, which comprises making the total pressure applied by the liquid to the dispersion surface substantially equalized over at least a greater part of said surface by compensating for the change of hydrostatic pressure applied to the dispersion surface and increasing along with depth, with dynamic pressure produced by the motion of the liquid and of which the value is caused to change in the desired manner along with depth by changing the flow rate and the shape of the flow space.

There is provided a dispersing device for bringing the liquid or slurry into motion and for introducing gas inside the liquid, dispersion surface parts being under the influence of different hydrostatic pressures effected by the liquid in motion, said surfaces being shaped so that that part of the hydrostatic pressure on the dispersion surface which changes according to depth is compensated for with a changing dynamic pressure so that the total pressure caused by the liquid to the dispersion surface is substantially equal over at least a greater part of said surface.

The description below of the device according to the invention is limited to a discussion of a situation in which air or some other gas is dispersed into a liquid. The discussion is also limited to relate primarily to situations appearing in flotation machines or in other aeration of liquid or in the dispersion of some other gas, because a logical general discussion would be extremely painstaking. The examples apply, however, to more general situations as well.

The starting point of the device according to the invention is the obvious fact that the ability of one surface area unit of the dispersion surface to disperse air, as small bubbles, into a liquid is limited, and if this limit is surpassed the results will be poorer; in this case mainly the bubble size increases and if the load per surface area unit is further increased the air begins to escape, without being dispersed, directly through the slurry to the surface of the cell. When the cell size grows, it is economically and technologically advantageous to continue to use one air dispersion mechanism per cell tank, or in any case, as small a number of mechanisms as possible, depending on the type, and thereby the amount of air dispersed through one mechanism increases greatly.

The situation is discussed below in regard to mechanical cells equipped with rotor and stator. Sometimes the mechanical cells may also lack the actual stator in the conventional sense.

When the cell size grows, the shape of the cell remaining the same, the cell volume grows in proportion to the third power of the linear dimensions. The free liquid surface, and also the necessary air amount grow in proportion to the second power of the linear dimensions. In mechanical cells the circumference of the rotor, whence the air dispersion takes place grows in proportion to the first power of the linear dimensions. If, when the cell size grows, the part of the depth of the rotor which serves as the dispersing zone also grew in proportion to the linear dimensions, the dispersing area would also grow in proportion to the second power of the linear dimensions, as does the air to be dispersed. This is obviously not the case, as the effective height of the dispersion zone is rather a certain amount of hydrostatic pressure, which is nearly independent of the rotor size. If the rotor structure is such that increased air feed can press the liquid level lower in the rotor, e.g., Agitair or Fagergren, and thereby automatically increase the dispersion surface, the air in the rotor has a pressure corresponding to the lower surface of the liquid. The air does not discharge evenly from the free surface of the dispersion zone facing the liquid but primarily from the area of the least outside pressure, i.e., usually from the upper part of the mechanism and hardly at all from the area of the greatest pressure, or the lower part. If the free interface between the air and the liquid in the dispersion zone is determined by the structure, e.g., Denver, the situation is the same. The air discharge strongly "favors" the areas of the lowest external pressure in the said interface, and thereby, when the air feed is increased, overloading occurs first in these areas. One proof of the fact that the dispersion zone height in the known cell types does not grow automatically along with the cell and mechanism size is that when the cell size has been increased it has often been necessary to alter the structure of the mechanism considerably.

In the device according to the present invention, by using the dynamic pressure produced by liquid in a state of motion, a situation is created in which the said dynamic pressure compensates on the dispersion surface for the differences in the hydrostatic pressure directed at it at its different depths so that the entire dispersion surface is subjected to an equal external pressure regardless of the depth. Thereby a situation is achieved in which the fed air does not particularly favor any parts of the zone but is distributed evenly over the entire surface. The effective dispersion surface obtained by this principle is also considerably larger in area than in the previously known devices so that the great air amount required by large cells can be easily dispersed qualitatively well, i.e., into fine bubbles. In an air dispersing mechanism according to this principle, in contrast to the previously known ones, the dispersion surface increases in proportion to the square of the linear dimensions of the mechanism so that the air dispersion is successful also in very large cells, and the structure and shape of the dispersing mechanism can be independent of the size of the mechanism.

The device also has an advantage in that, since the dispersion of air takes place under equal conditions over the entire surface, these conditions can be optimized in terms of dispersion and energy consumption, and thereby considerable energy savings can be obtained in comparison with the previously known structures, and these savings of energy can be achieved in rather small cells as well. As an example of dynamic pressure can be mentioned the pressure caused by centrifugal force, vacuum caused by velocity in, for example, a venturi, the pressure affecting a body in a flow, for example, stagnation pressure, or generally the pressure distribution on the surface of a body, etc.

Below is a simplified mathematical treatment of a case of pressure created by centrifugal force. FIG. 15 shows a rotating circular element 151 of liquid. Element 151 rotates around axis 152 in the direction of arrow 153, and has radius ($r$) 154 and radial thickness ($dr$) shown between radius 154 and arrow 155.

The angular velocity of the liquid is $\omega$. The differential change of pressure in the circle is $$dp_d = \rho \omega^2 r dr$$

and the change of pressure when proceeding from the rotor surface to the stator surface, or $r_i \rightarrow r_s$, is $$p_d = \rho \int_{r_i}^{r_s} \omega^2 r dr \quad (1)$$

$\rho$ is assumed to be constant and $\omega$ to be a function of the depth and radius, of the form:

$$\omega = \omega(z) \cdot f(r/r_s)$$

the result is $$p_d = \rho\omega^2(z) r_i \int^{r_s} f(\frac{r}{r_c})^r dr \quad (2)$$

The dimension of the integral is $[L]^2$. It can be brought into a dimensionless form by dividing it, for example, by $r_c s$, in which $r_c$ is a constant, a radius of which the value is almost the same as that of $r_i$ and $r_s$, and s is the dispersion clearance.

Thus, $$P_d = \rho\omega^2(z) r_c s \, \chi(\xi) \quad (3)$$

is obtained, in which $$\chi(\xi) = \frac{1}{r_c s} \int_{r_i}^{r_s} f \frac{r}{r_c} \, r dr \quad \xi = \Delta z / r_c$$

$\chi(\xi)$ is in most cases almost constant and its value $\simeq 1$, and the value of $r_c$ can be selected so that, for example, in the upper part of the mechanism $\chi(O) = 1$.

It is appropriate to bring $\omega(z)$ into the form $\omega(z) = \omega_o \Omega(\xi)$, whereby the change of angular velocity in the clearance is described by formula $$\omega = \omega_o \Omega(\xi) f(r/r_c) \quad (4)$$

$\omega_o$ is the angular velocity at $r = r_o$, $z = z_o$ = the upper edge of the dispersion zone. Thereby, the formula $$p_d = \rho\omega_o^2 \Omega^2(\xi) r_c s \, \chi(\xi) \quad (5)$$

is obtained for $p_d$, and the formula $$p_i = \rho g z - \rho\omega_o^2 \xi^2(\xi) r_c s \, \chi(\xi) \quad (6)$$

for the total pressure directed at the dispersion surface. In the upper part of the dispersion clearance $\xi = o$, and $$p_{io} = \rho g z_o - \rho\omega_o^2 r_c s_o$$
$$\Omega(O) = 1$$
$$\chi(O) = 1 \quad (7)$$

By dividing the difference of the equations by the last term of the latter equation, $$g/2 \cdot \Delta Z/s_o = \Omega^2(\xi) \cdot s/s_o \chi(\xi) - 1 \quad (8)$$

is obtained, from which $$\frac{s}{s_o} \chi(\xi) = \frac{1}{\Omega^2(\xi)} \left[ \frac{g}{\omega_o^2 r_c} \cdot \frac{\Delta Z}{s_o} + 1 \right] \quad (9)$$

Previously $\chi(\xi)$ has been noted generally to be $\simeq 1$ in conventional mechanism structures. From the derived equation it can be noted that the clearance increases along with $\Delta z$ and the shape of the clearance is strongly dependent on the way the angular velocity changes as the function of depth, i.e., $\Omega(\xi)$. Below, the formula $\chi(\xi)$ is treated in one special case. For example:

$$\omega = \omega(Z) \cdot \frac{r_c^2}{r^2} \therefore f\left(\frac{r}{r_c}\right) = \frac{r_c^2}{r^2}$$

$$\int_{r_i}^{r_s} f\left(\frac{r}{r_c}\right) r dr = \int_{r_i}^{r_s} \frac{r_c^4}{r^3} dr = \frac{r_c^4}{2} \left( \frac{1}{r_i^2} - \frac{1}{r_s^2} \right)$$

-continued $$= \frac{r_c^4}{2} \cdot \frac{(r_s - r_i)(r_s + r_i)}{r_i^2 r_s^2} = r_c s \cdot \frac{r_c^3 (r_s + r_i)/2}{r_i^2 r_s^2}$$

$$\chi(\xi) = \frac{r_c^3 (r_s + r_i)/2}{r_i^2 r_s^2} = \frac{r_c^3 (r_s + r_i)/2}{(\sqrt{r_i r_s})^4}$$

The value of $r_c$ can be determined so that at the upper edge of the mechanism $\chi(\xi) = 1$. This is so even in a general case. $\chi$ is a function of $\xi = \Delta z/r_c$, because either $r_s$ or $r_i$ or both are functions of $\xi$. In most cases, however, $\chi(\xi) \simeq 1$ as a first approximation.

If the change of angular velocity as a function of the radius r is different than in the presented example, the formula of $\chi(\xi)$ is also different. If $r_i$ and $r_s$ do not change very much within the area of the dispersion zone, $\chi(\xi) = 1$ in the entire area.

The equation (9) expresses the gist of the invention applied to a mechanical cell: the dispersion clearance of the mechanism is determined as the function of depth, and thereby those stator and rotor surfaces which face each other, so that the centrifugal force generated in the slurry which is in a rotatory motion in the clearance cancels at all heights of the dispersion zone the changes in hydrostatic pressure caused by the difference of depth, and consequently a constant pressure prevails over the entire dispersion surface. The parts which cause the change of angular velocity as a function of depth, $\chi(\xi)$, e.g., the inner structure of the rotor and the direction of the slurry circulation (from above and/or from below), can also be the objects of this shaping when the objective is a clearance which changes in the desired manner. Owing to the general character of the method, the equation (9) can be realized in innumerable different ways.

In addition to the said condition of constant pressure, advantageous operation requires that besides air, also slurry flows into the dispersion zone and that the slurry flow is evenly distributed over the surface in question and its rate is in a suitable proportion to the air flow to produce an air-slurry suspension under advantageous conditions.

In the stator and elsewhere in the cell space the flow must be turbulent enough to provide the conditions for the impinging of the air bubbles and the mineral particles and for the formation of agglomerates. In addition, the suspension flow produced by the mechanism must be sufficiently strong to keep the solid dispersed in the liquid in order that agglomerates can form.

DESCRIPTION OF THE PREFERRED EMBODIMENTS

Referring to the above theory, the starting point of the observation below is the device shown in FIG. 1, which may be, for example, a froth flotation cell. Its most important parts are a rotating rotor 1 and a stationary stator 2. The rotor fastened in a vertical shaft rotates in the slurry, and air is fed through the rotor into the clearance 3 between the rotor and the stator.

Figure 11:
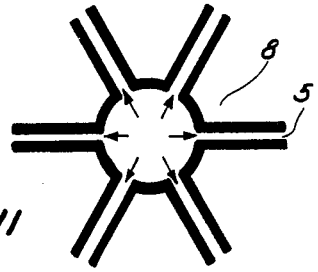
Figure 15:
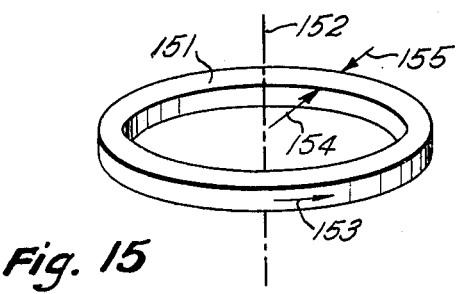
FIG. 15 shows a rotating circular element of liquid.

If the rotor structure has a cross section as shown in FIG. 11, it has alternately air gaps 5 and slurry grooves 8 extending to the dispersion surface. Owing to the slurry grooves the rotor also serves as a pump and moves slurry onto the dispersion surface. The air discharges through the air gaps onto the said surface. The fine bubbles necessary in froth flotation are produced on the dispersion surface and in the clearance 3. In the rotor section according to FIG. 1, on the right side can be seen the liquid flow between the rotor blades and on the left side the air inlet space is connected with the hollow shaft.

In this case the envelope surface of the rotor is cylindrical and the condition of constant pressure on the dispersion surface has been realized by, for example, the shape of the stator. Air is introduced onto the dispersion surface over the entire rotor height along separate air gaps (FIG. 11) which divide the rotor mantle surface into alternate air gaps and slurry grooves. The slurry grooves which have a V-shaped cross section are in this case open at their upper ends so that the slurry can flow into them and is removed from the rotor by centrifugal force onto the dispersion surface and further, after aeration, through the stator into the cell. The stator does not entirely attenuate the rotatory impulse given to the slurry by the rotor, but the entire slurry amount in the cell is in slow rotatory motion. As the slurry flows from above the mechanism towards the rotor, the angular velocity of its rotatory motion increases according to the impulse formula so that it has some rotatory momentum already upon entering the rotor. The rotor gives further impetus to the rotatory motion in a manner which depends on the system of introducing the slurry into the rotor, the shapes and construction of the slurry grooves and the dispersion surface, the delay period of the slurry inside the rotor, etc. The slurry flowing onto the dispersion surface from inside the rotor thereby has an angular velocity which is a function of the depth coordinate in a manner dependent on the former factors. Around the slurry flow entering the rotor there is a parallel flow pulled along by it; this flow passes the rotor directly into the dispersion clearance, where the turbulence and mixing are effective, and into the stator, where its smaller rotatory impulse decreases the strength of the turbulences between the stator plates. This additional flow contributes to a change in the angular velocity of the slurry in the dispersion clearance from that given to it by the rotor, whereby the result is an angular velocity distribution $\omega = \omega(z,r)$ which is a function of the depth and the radius. In the above treatment of the dynamic pressure the result was an equation (9) which contains a prerequisite for the production of a constant-pressure situation. According to it, $s/s_o\chi(\xi)$ must change in a manner which is dependent on $\Omega^2(\xi)$ and $\Delta z$. In most constructions $\xi = \Delta z/r_c \cdot \chi(\xi)$ is almost constant $\simeq 1$, so that usually $s/s_o$ must change in the said manner. The change of the clearance s as a function of the depth $\Delta z$ is substantially dependent on the change of the angular velocity as a function of the depth $\xi = \Delta z/r_c$.

Let it also be noted that $\Omega(\xi)$ depends on the shape and internal parts of the rotor and on the manner in which the slurry flows in, while the clearance $s(\xi)$, or more precisely $s/s_o\chi(\xi)$, depends on $\Omega(\xi)$ and $\Delta z$ so that the clearance is in many ways a function of the other parts of the mechanism.

Figure 1:
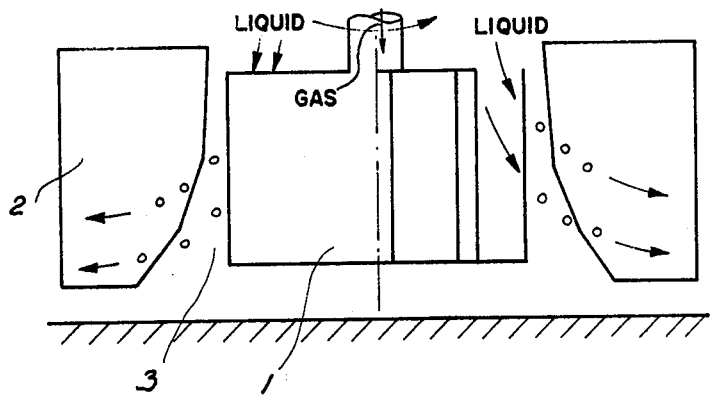
FIGS. 1 to 7 show embodiments of a device according to the invention consisting of a rotor-stator combination.

FIG. 1 thus shows a case in which a cylindrical rotor is surrounded by a stator shaped so that the condition of constant pressure is fulfilled. The slurry grooves of the rotor are open at their upper ends so that an upsided circulation of slurry is produced in which the angular velocity of the slurry on the dispersion surface increases downwards. In such a construction the dispersion clearance which fulfills the condition of constant pressure usually widens mainly downwards, but in the upper part the clearance may be constant or widen upwards.

Figure 2:
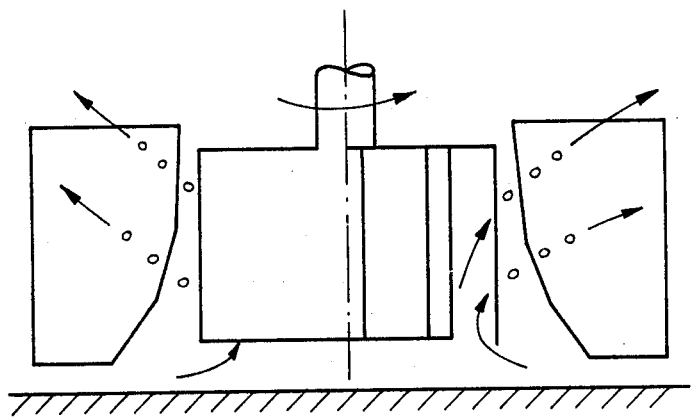

FIG. 2 illustrates a structure otherwise similar to that in FIG. 1, but the slurry grooves are open at their lower ends. Thus, in the mechanism an undersided circulation is produced in which the angular velocity of the slurry on the dispersion surface increases upwards. In the upper parts the angular velocity may be independent of the height. The clearance necessary for fulfilling the condition of constant pressure increases strongly downwards, and its upper part is possibly constant or almost constant.

Figure 3:
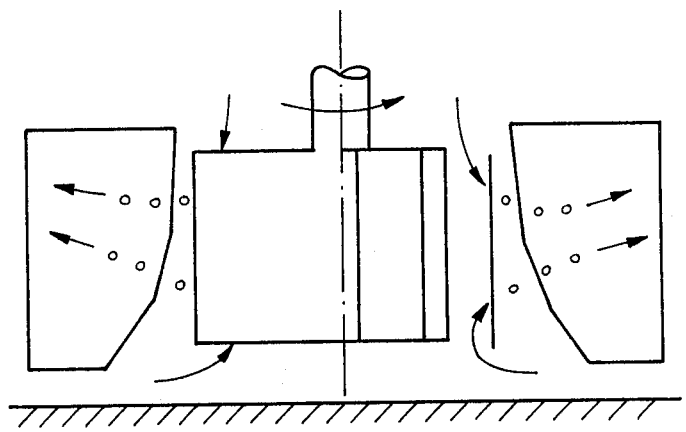

FIG. 3 shows a structure otherwise similar to those in FIGS. 1 and 2, but the slurry grooves are open at both their upper and lower ends, whereby both an up- and undersided circulation is produced. The angular velocity of the slurry in the clearance is at its lowest in both the upper and the lower part of the dispersion zone. The clearance required for fulfilling the condition of constant pressure increases mainly downwards, and its upper part may be constant or increase upwards.

Figure 4:
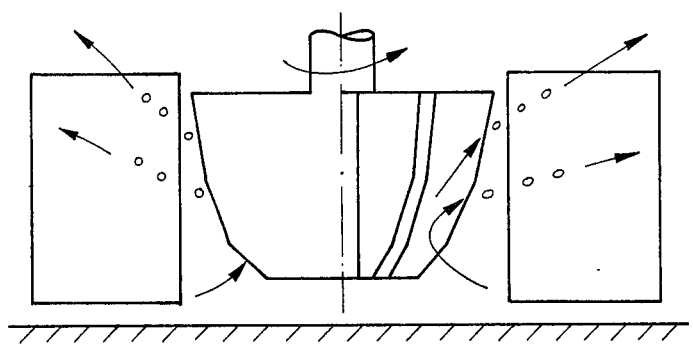

FIG. 4 illustrates a case in which the inner envelope surface of the stator is cylindrical and the condition of constant pressure is fulfilled by means of the rotor shape. The entrance of slurry into the rotor from above has been blocked and the slurry ends up on the dispersion surface so that the rotor sucks slurry from the cell into its smaller-diameter lower part, and under the influence of centrifugal force the slurry discharges from the wider-diameter upper part of the rotor. Thus a pure undersided circulation is produced in the cell and the angular velocity of the slurry increases strongly upwards. The clearance necessary for fulfilling the condition of constant pressure increases strongly downwards and is possibly constant or almost constant in its upper part. The change in the clearance has been implemented by means of the rotor shape.

Figure 5:
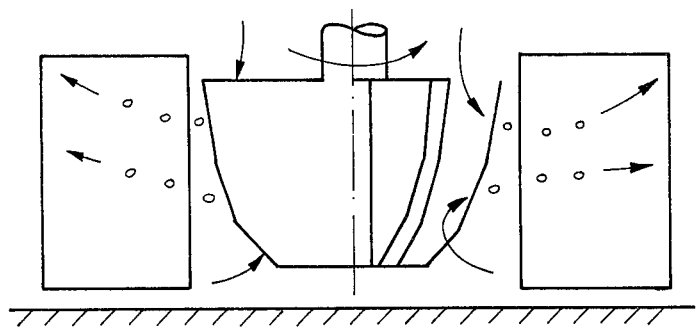

FIG. 5 shows a construction otherwise similar to that in FIG. 4, but the slurry grooves are open even at their upper ends, whereby even an upsided circulation is produced in addition to the undersided one. This affects the angular velocity of the slurry in the clearance. The clearance necessary for fulfilling the condition of constant pressure mainly increases strongly downwards and is possibly constant or almost constant or increases upwards in its upper part.

Figure 6:
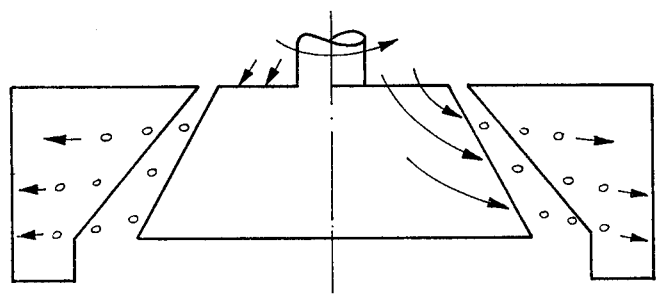

FIG. 6 shows a construction in which the rotor widens downwards. The entrance of the slurry into the rotor from below has been blocked and the slurry arrives on the dispersion surface so that the rotor sucks slurry from the cell into its smaller-diameter upper part, and under the influence of centrifugal force the slurry discharges from the wider-diameter lower part of the rotor. Thus a pure upsided circulation is produced in the cell and the angular velocity of the slurry increases strongly downwards. The clearance required for fulfilling the condition of constant pressure increases downwards or is almost constant. The change in the clearance has been implemented by means of the shape of either the rotor or the stator.

Figure 7:
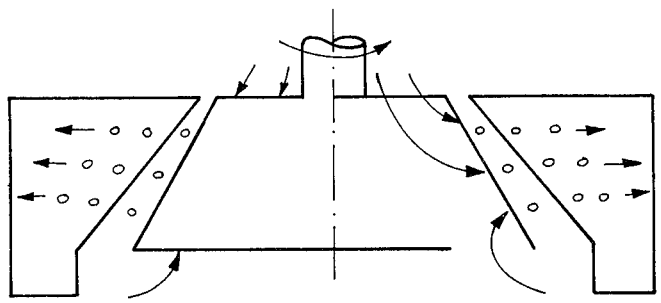

FIG. 7 shows a construction otherwise similar to that in FIG. 6, but the slurry grooves are open even at their lower ends, whereby even undersided circulation is produced in addition to the upsided one. This affects the angular velocity of the slurry in the clearance. The clearance necessary for fulfilling the condition of constant pressure increases downwards or is almost constant and in its lower part it possibly increases strongly downwards.

FIGS. 8 to 11 show a few rotor cross sections suitable for introducing onto the dispersion surface the air necessary for the dispersion.

Figure 8:
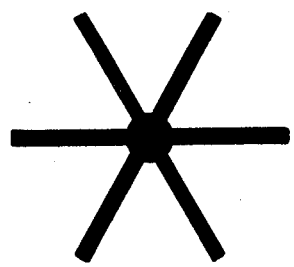
FIGS. 8 to 11 show some preferred cross sections of the rotor.
Figure 12:
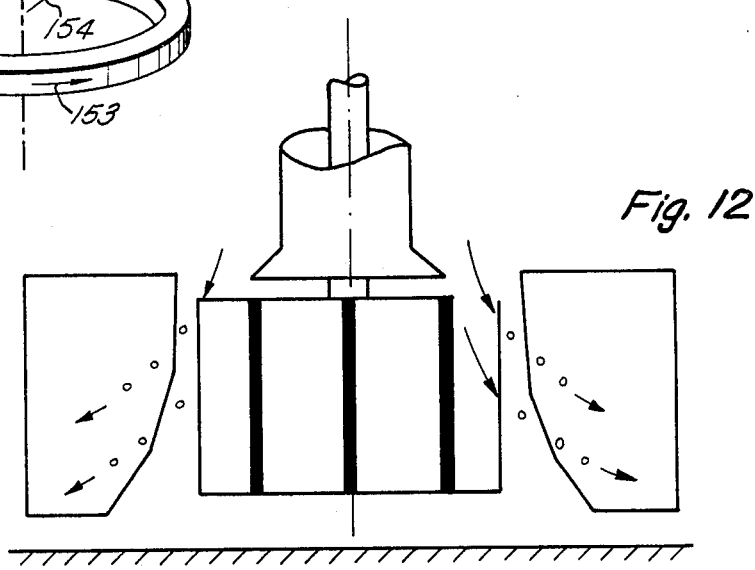
FIGS. 12 to 14 show alternative devices, relating to the previous figures, of introducing air into the rotor.

In the embodiment according to FIG. 8, air is mixed with the slurry even before reaching the rotor, for example, by means of a construction according to FIG. 12, in which air is fed through a standpipe above the slurry grooves of the rotor, from where it is carried along, mixed with the slurry, onto the dispersion surface.

Figure 9:
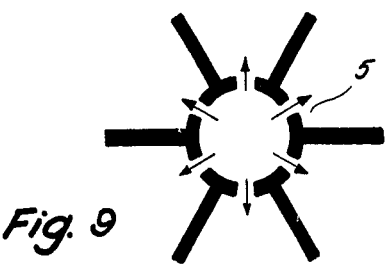
Figure 10:
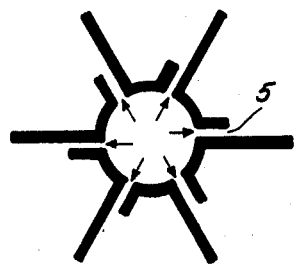
Figure 13:
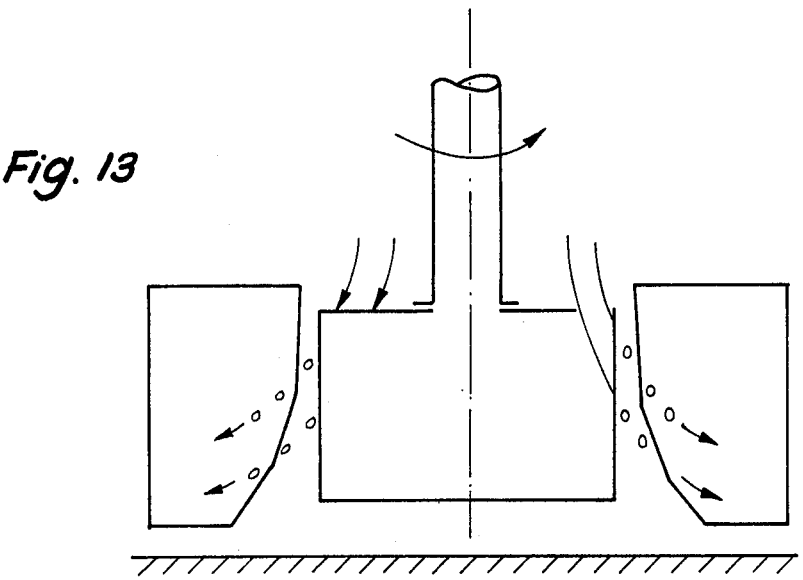
Figure 14:
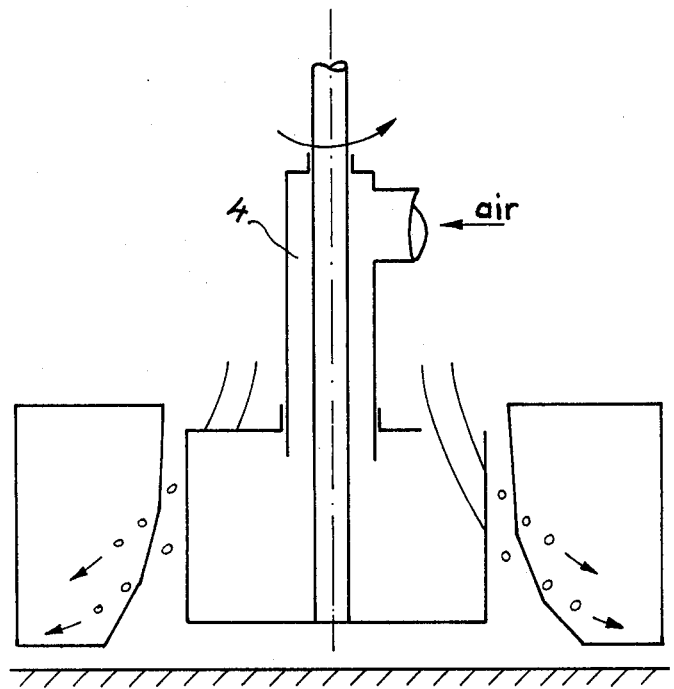

In the constructions according to FIGS. 9 to 11, the air is introduced into a specific air space inside the rotor, for example, in the manner illustrated in FIG. 13, through a hollow shaft, or in the manner illustrated in FIG. 14, through a standpipe 4. In the cases shown in FIGS. 9 to 10 the air discharges from the air space of the rotor into the slurry flowing in the slurry grooves and is carried along with it onto the dispersion surface. In the construction shown in FIG. 11 the air is introduced through specific air gaps directly onto the dispersion surface and is not mixed with the slurry until it reaches the surface.

In all cases, the air must be mixed with the slurry so that the air content of the slurry arriving on the dispersion surface is the same regardless of the place. This, again, prerequires that a situation similar to the condition of constant pressure prevail even at the air feeding points, i.e., the air discharge openings must be placed so that the pressure applied to them by the slurry is the same at all places in the openings. In the case shown in FIG. 13, it is necessary to fulfill the condition of constant pressure only on the dispersion surface. If the air is mixed with the slurry at an earlier stage, the condition of constant pressure must be fulfilled even in the air discharge openings.

Naturally, in the cases according to FIGS. 1 to 7, solutions can be applied which follow similar principles but deviate from those illustrated in the figures in regard to the manner of introducing the air and to the rotor construction.

What is claimed is:

1. A dispersing device for dispersing a gas into a liquid or slurry, which comprises: a cell for containing the liquid or slurry, a rotor on a hollow rotor shaft rotatable about a vertical axis and disposed in said cell below the level of liquid or slurry, the shaft having means connectable to a source of gas, and the rotor having a dispersion surface essentially constituted by a mantle surface at the periphery of the rotor, blades forming vertical walls over substantially the entire height of the rotor and gas gaps over the entire rotor height communicating with the shaft for bringing the gas to the dispersion surface; a stator comprising vertical vanes disposed within said cell extending radially outwardly with respect to said shaft and surrounding the rotor, said stator defining, together with the rotor, an annular space therebetween for the liquid to be rotated as a ring by the rotor, said stator opposing the rotation of the liquid and causing turbulence in said annular space, said rotor and stator being of substantial height, coextensive over their heights and so shaped that the annular space therebetween widens downwardly along substantially the whole of the rotor height, the ringshaped body of liquid so formed creating a dynamic pressure and thereby compensating for the hydrostatic pressure across the height of the rotor.

2. The device of claim 1 wherein the cross section of the stator is essentially constant and the cross section of the rotor decreases with increasing depth.

3. The device of claim 1 wherein the cross section of the rotor is essentially constant and the inner diameter of the stator widens with increasing depth.

4. A device according to claim 1 wherein the rotor is also provided with outlets for liquid, said gas gaps and liquid outlets being positioned alternately at the rotor periphery and separated from each other by the dividing vertical walls so that separate channels are provided for the gas and the liquid respectively, the channels for the liquid being constituted by grooves having a height essentially equal to the height of the rotor and open at least in an axial direction from which liquid is introduced into the rotor to flow in said channels.

5. A device according to Claim 1 which additionally contains means causing liquid emerging from the rotor at greater depth to be conducted a longer distance in contact with the rotor to impart an angular velocity to the liquid, which velocity increases with depth.

* * * * *